(12) United States Patent
Capozzi et al.

(10) Patent No.: US 6,179,305 B1
(45) Date of Patent: *Jan. 30, 2001

(54) ACCESSIBLE SEATING ASSEMBLY (76) Inventors: Matthew V. Capozzi; Nathan T. Connolly, both of 459 NW. Broadway, Bend, OR (US) 97701; Colin S. Twitchell, Hampshire College, Amherst, MA (US) 01002

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/036,643

(22) Filed: Mar. 6, 1998

Related U.S. Application Data (60) Provisional application No. 60/040,095, filed on Mar. 7, 1997.

(51) Int. Cl.[7] .................................................. B62B 9/99
(52) U.S. Cl. ....................... 280/28.14; 280/14.1; 280/845
(58) Field of Search ................................ 280/28.14, 845, 280/14.1, 14.2, 15, 16, 18, 21.1, 28, 28.15, 28.16; 297/344.22, 344.26

(56) References Cited

U.S. PATENT DOCUMENTS

| | | | | |
|---|---|---|---|---|
| 170,012 | * | 11/1875 | Newbrough | 297/344.22 |
| 1,084,697 | * | 1/1914 | Foster | 280/28.14 |
| 3,190,668 | * | 6/1965 | Husak | 280/28.14 |
| 3,325,179 | * | 6/1967 | Bissett | 280/28.14 |
| 3,560,012 | * | 2/1971 | Auer | 280/16 |
| 3,830,513 | * | 8/1974 | Hunt | 280/28.14 |
| 3,917,301 | * | 11/1975 | Fabris | 280/28.14 |
| 4,193,609 | * | 3/1980 | Bissett | 280/28.14 |
| 4,310,169 | * | 1/1982 | Brough | 280/28.14 |
| 4,353,573 | | 10/1982 | Morgan . | |
| 4,632,408 | | 12/1986 | Olpp . | |
| 4,865,572 | | 9/1989 | Andes . | |

FOREIGN PATENT DOCUMENTS

2592806 * 7/1987 (FR) ...................................... 280/14.1

OTHER PUBLICATIONS

Tech Update; Students Learn to Invent, Popular Mechanics, Jul. 1997 issue, p. 24.

* cited by examiner

Primary Examiner—J. J. Swann
Assistant Examiner—James S. McClellan
(74) Attorney, Agent, or Firm—Ronald R. Kilponen

(57) ABSTRACT

An accessible seating assembly for a snowboard which allows a physically challenged skier to participate in the sport of snowboarding. The seating assembly is composed of a rotatable seat to allow for transverse or forward-facing seating arrangement. The seating assembly is also capable of raising up to allow for users to ride conventional chair lifts without being detached from the seating assembly. The nature of the seating assembly allows for adaptation for riders of either orientation, goofy or standard. A further benefit of the seating assembly is that it is easily attached to a conventional snowboard or similar apparatus. This aids the user in the purchase of snowboards and also in changing the assembly from one snowboard to another. An adjustable shock absorber is included to cushion the user in a way similar to a normal rider's knees. It is also capable of adjusting to riders of different weight.

9 Claims, 9 Drawing Sheets

ACCESSIBLE SEATING ASSEMBLY

This patent application is a continuation of the Provisional Patent Application 60/040,095 filed on Mar. 7, 1997 to Capozzi et al.

FIELD OF THE INVENTION

The present invention primarily relates to snowboarding and skiing. Specifically, it provides an opportunity for an individual to use a snowboard or monoski from a seated position. The device is particularly useful for physically challenged individuals and provides them a means to enjoy the sport of snowboarding or skiing. The accessible seating assembly could also be adapted for use as a skateboard or other mounted uni-track apparatus which could be controlled by a rider's weight shifts and rotational movements.

BACKGROUND OF THE INVENTION

Currently, various ski systems exist for physically challenged individuals. The current systems include the use of a seating apparatus attached to a conventional ski or a monoski where the user faces forward and in line with the longitudinal direction of the ski. Usually these systems require specialized poles for balance or stability, as well as directional guidance while in use. Also, some of the monoski systems are used with the assistance of another non-physically challenged skier who provides guidance and assists the physically challenged skier in maintaining balance and controlling their path of movement.

Other systems for physically challenged skiers provide a seating assembly attached in a forward facing orientation to a pair of skis. The seating assembly allows the user to face forward and use ski-crutches or other specialized poles in order to control their path of motion.

Still other monoski systems use steering devices such as handles that attach to the single ski. The steering devices require the user to lean forward in a kneeling position and from that position attempt to maintain balance and directional control. This type of steering means leaves the physically challenged user vulnerable to loss of balance or directional control and leaves them highly susceptible to injury.

While standing skiers not otherwise physically challenged are able to exert both weight shifting and rotational movements to control direction, it is very difficult for a seated skier to use such body motion to affect directional control.

A further problem commonly associated with the ski systems designed for the physically challenged involves the inability to use a conventional ski lift in the usual manner.

The above systems are generally directed to use for downhill snow skiing. However, systems adapted to use by physically challenged users are also available for water skiing. In water skiing, propulsion and primary directional guidance are provided by gripping a tow rope attached to a power boat. Weight shifting is the primary means for directional control. Using one ski requires greater skill and agility than using two, as balance becomes a more critical issue.

The physically challenged water skier is generally towed on a two-ski assembly or on a platform wide enough to provide stability from tipping over sideways. Basic water skiing in this manner requires a lesser overall control capability of the user and ski system for maintaining balance and applying directional control. As in conventional snow skiing, the water skier faces forward in line with the longitudinal direction of the ski. Both snow skis and water skis are limited in their lateral motion over the support medium; their long, narrow shape designed primarily for forward movement.

Skateboards use a wheel assembly on each end that steers left or right both to maintain balance and control direction in response to the user's weight-shifting. Frames have been adapted to skateboards to allow a user to sit, kneel or crouch down on the skateboard and hold on to outriggers to help in weight-shifting; however, these adaptations constrain riders to face primarily forward.

Snowboards, arriving relatively recently, are shorter and wider than snow skis. They are mounted in a transverse fashion, are capable of being rotated and controlled by a combination of weight shifting and body twisting, and can be ridden laterally or longitudinally at will down the slope. They have, however, been inaccessible to physically challenged users, until now.

SUMMARY OF THE INVENTION

The invention in its simplest form is an accessible seating assembly mounted on a snowboard or any other equivalent apparatus. The invention allows a user to operate a snowboard from a seated or kneeling position, without the use of poles, handles, or steering devices for stability. Due to the assembly's low profile, a user may propel himself using his hands, if necessary. The user is strapped securely in a seated or kneeling position to the seat on the board. In the riding position, the seat is low and oriented transversely to the length of the board. The user faces perpendicular to the longitudinal direction of the snowboard, while riding. A suspension mechanism provides for shock absorption analogous to the knee action of a standing user. Being secured tightly at the hips and the thighs, the user is well-connected to the board and can use upper body motion to control movement of the board, similar to that of a standing user.

Moreover, for accessing ski lifts and tow bars, the seat rotates and allows the user to face forward, down the longitudinal axis of the board. Once facing forward, the user can elevate the seat and therefore be in a position to mount a conventional ski lift easily, while still seated in the apparatus.

The invention allows a physically challenged person to use a snowboard without the assistance of any poles and minimizes the assistance needed for getting onto and off of ski lifts. The rotatable seating assembly allows for an easy change in position from riding position to lift position. It also allows for users of any orientation (left or right handed) to use the same assembly without changing the mounting orientation on the snowboard. The invention allows physically challenged individuals the opportunity to experience snowboarding, in a near-natural manner, applying his or her upper body strength and agility to balance and control the board in much the same way as does a normal user.

The invention is made of a high strength metal or other material. It is desirable for the material to be lightweight as well. Materials suitable for the invention can be selected from the group consisting of, but not limited to; steel, aluminum, titanium, carbon fiber or other lightweight steel alloys. The preferred embodiment has two mounting feet that are attachable to snowboards or the like and are typically bolted in a standard pattern similar to regular snowboard bindings. The first foot of the assembly is attached to a primary suspension bar which serves as the mounting bar for the rotatable seating assembly. The rotatable seating assembly allows a user to easily adjust between the riding position (transverse) and the lift position (face-forward).

This seating assembly is then capable of being connected to any type of seat that a user would desire. The second foot is attached to a secondary suspension bar which functions to cushion the rider during use. This secondary suspension bar is typically a shock absorber of some type.

An alternative embodiment entails the use of only one foot that is connected to a snowboard. It is then connected to a primary suspension bar which would also function to cushion the rider during use.

BRIEF DESCRIPTION OF THE DRAWINGS

FIG. 6. Close-up of connection between lifting handle and secondary suspension bar FIG. 7. Second foot attached to a snowboard FIG. 8. A rear view of the preferred embodiment, with seat in lift position FIG. 9. A side view of the first foot attached to a snowboard

DETAILED DESCRIPTION OF THE DRAWINGS

Figure 1:
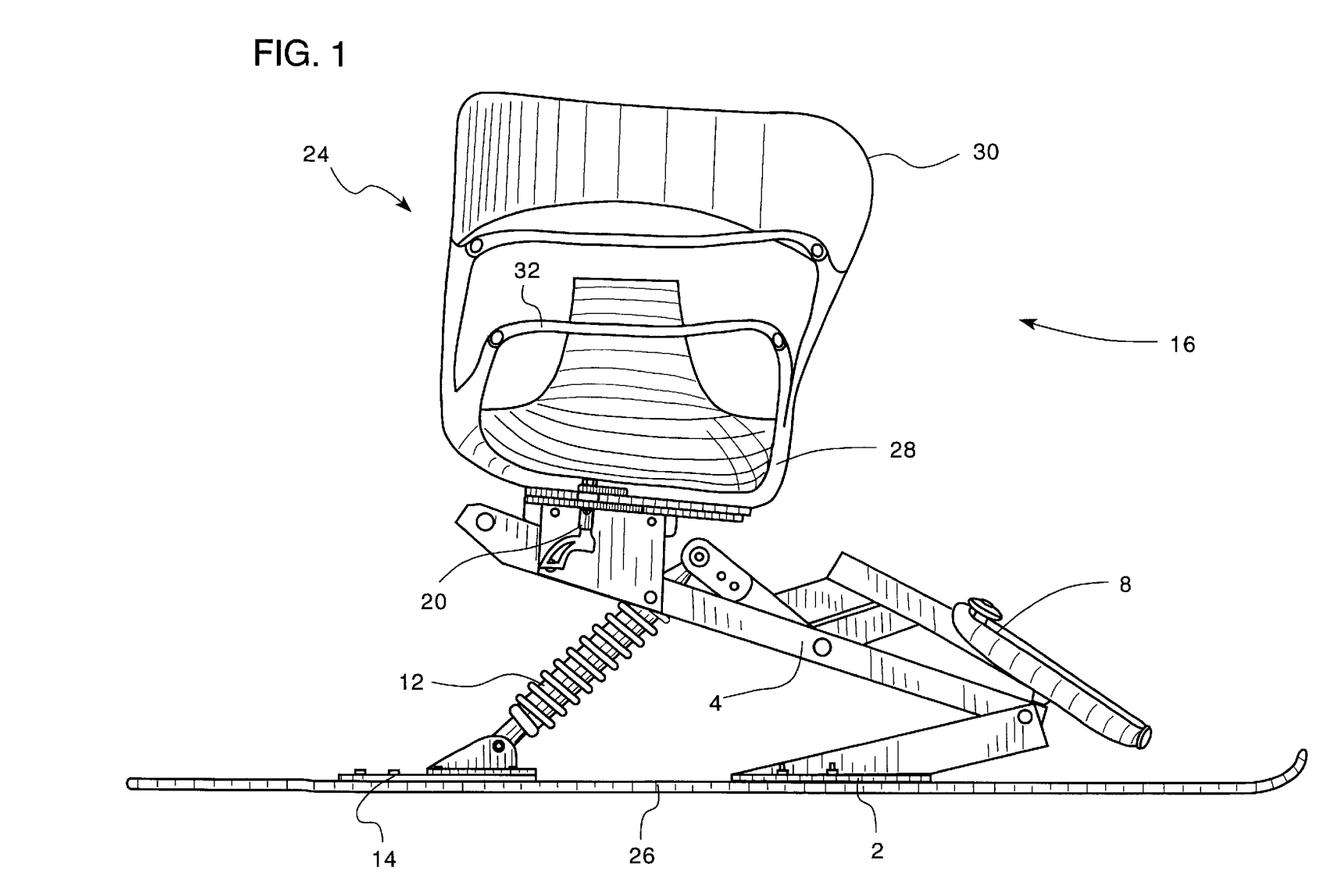
FIG. 1. A side view of the preferred embodiment, with seat in riding position

Turning now to FIG. 1, a detailed description concerning the present invention will now be provided. As can be seen in that figure, an accessible seating assembly is attached to a snowboard 26 at a first foot 2 and a second foot 14, with the first foot 2 and the second foot 14 preferably spaced as to conform with a typical bolting pattern used on a snowboard. The accessible seating assembly comprises a primary suspension bar 4 hingedly attached at its bottom to the first foot 2, a lifting handle lever 8 hingedly attached to the primary suspension bar 4 through a slot 10 (shown on FIG. 8) in the primary suspension bar 4, and a secondary suspension bar 12, preferably an adjustable shock absorber, hingedly attached at both its top and bottom to the lifting handle lever 8 and the second foot 14, respectively. A seating attachment 16 that preferably includes a seat 24 is rotatably attached to the top of the primary suspension bar 4. Preferably, the seat 24 is comprised of a base 28, a back support 30, and a leg strap 32.

Figure 2:
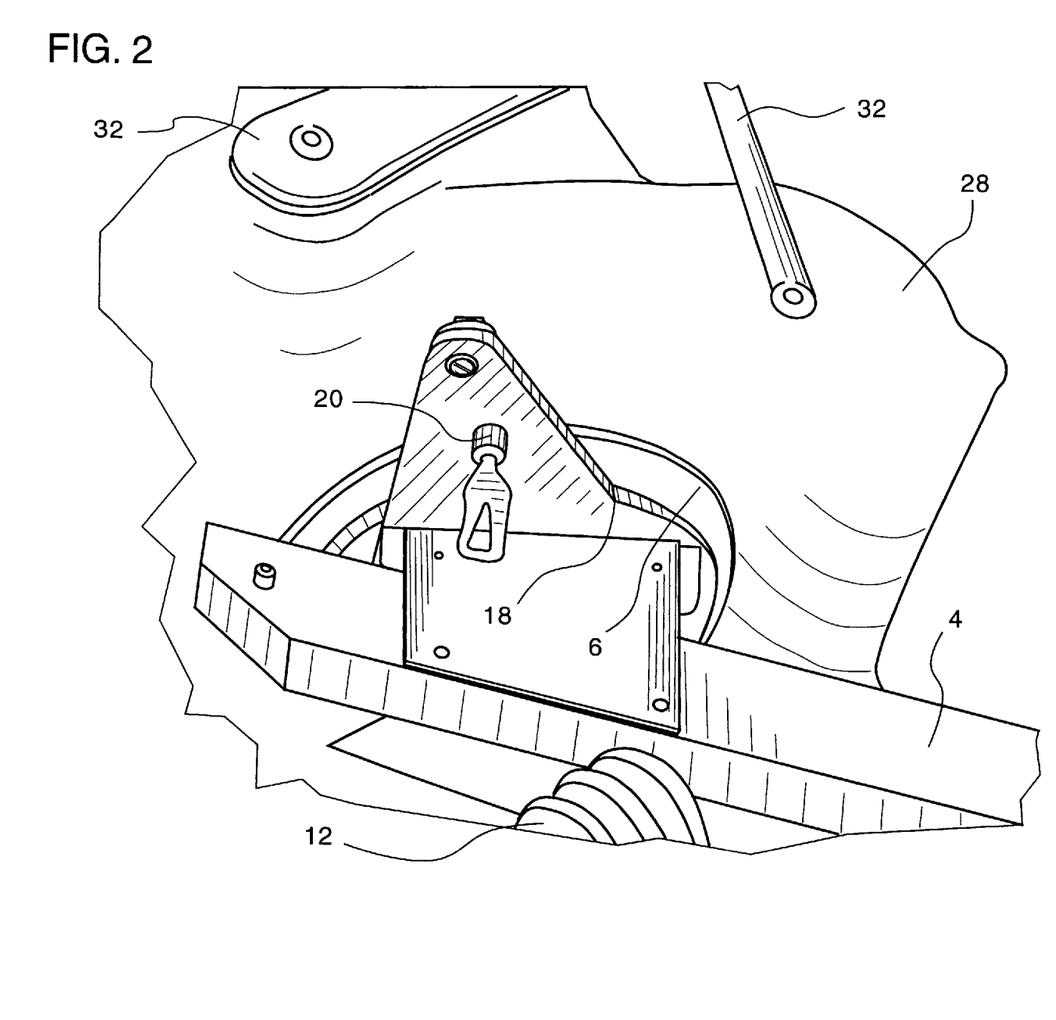
FIG. 2. A view of the rotation plate, with seat in lift position
Figure 3:
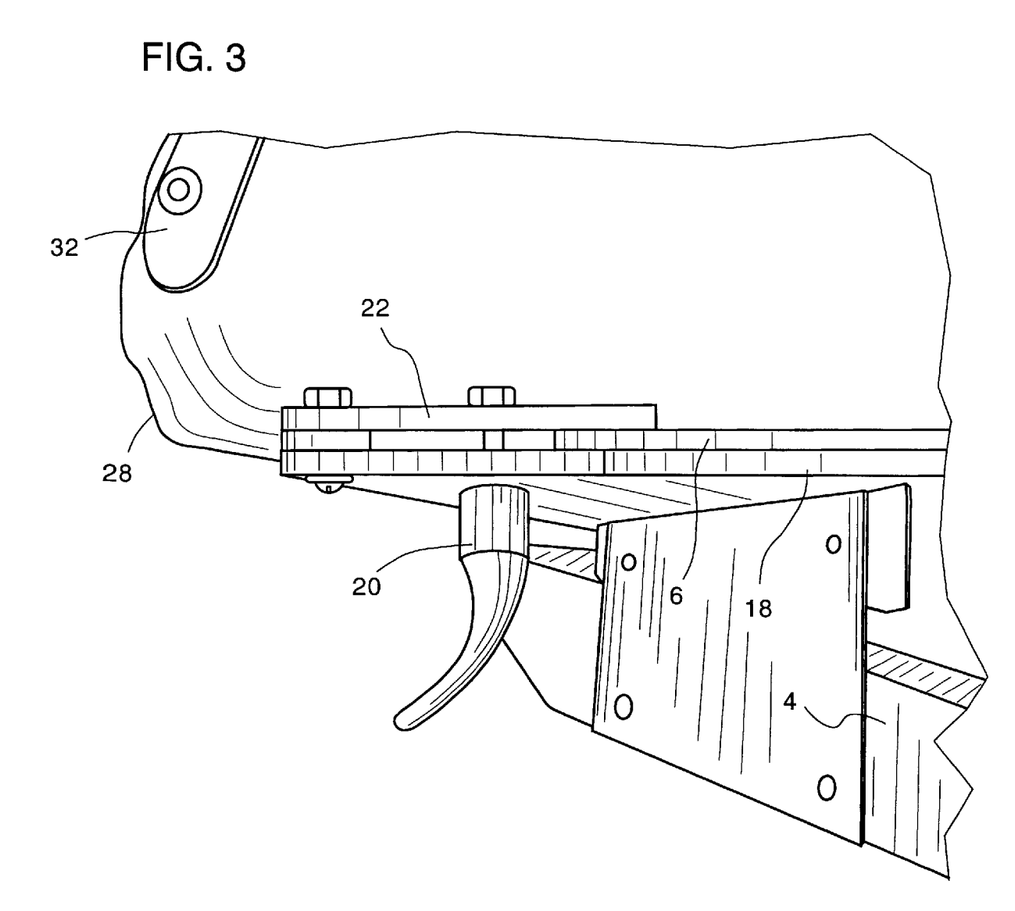
FIG. 3. A view of the clamp mechanism, with seat in lift position

As shown in FIGS. 2 and 3, a clamp plate 18 is fixed to the upper part of the primary suspension bar 4 through a center hole and a clamp bar 22 is connected to the clamp plate 18 through a clamp 20. A seat plate 6 that is attached to the base 28 of the seat 24 through a center hole lies between the clamp plate 18 and the clamp bar 22. The user is able to lock the seat 24 in place after rotating the seat 24 to a desired position by adjusting the clamp 20, which in turn minimizes the space between the clamp plate 18 and the clamp bar 22, thereby pinching the seat plate 6 such that it is held in place.

Figure 4:
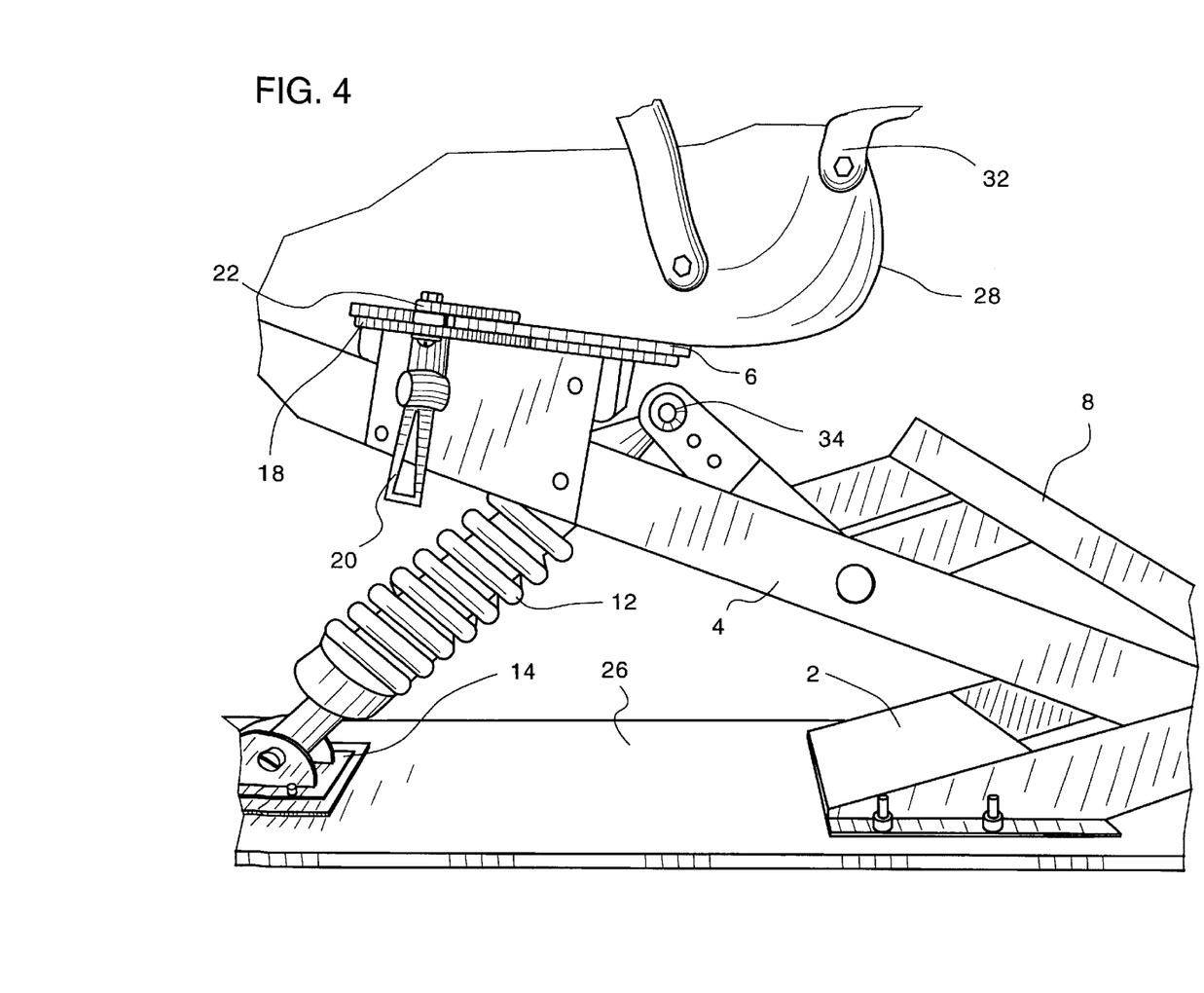
FIG. 4. A view of the lifting handle attached to secondary suspension bar
Figure 5:
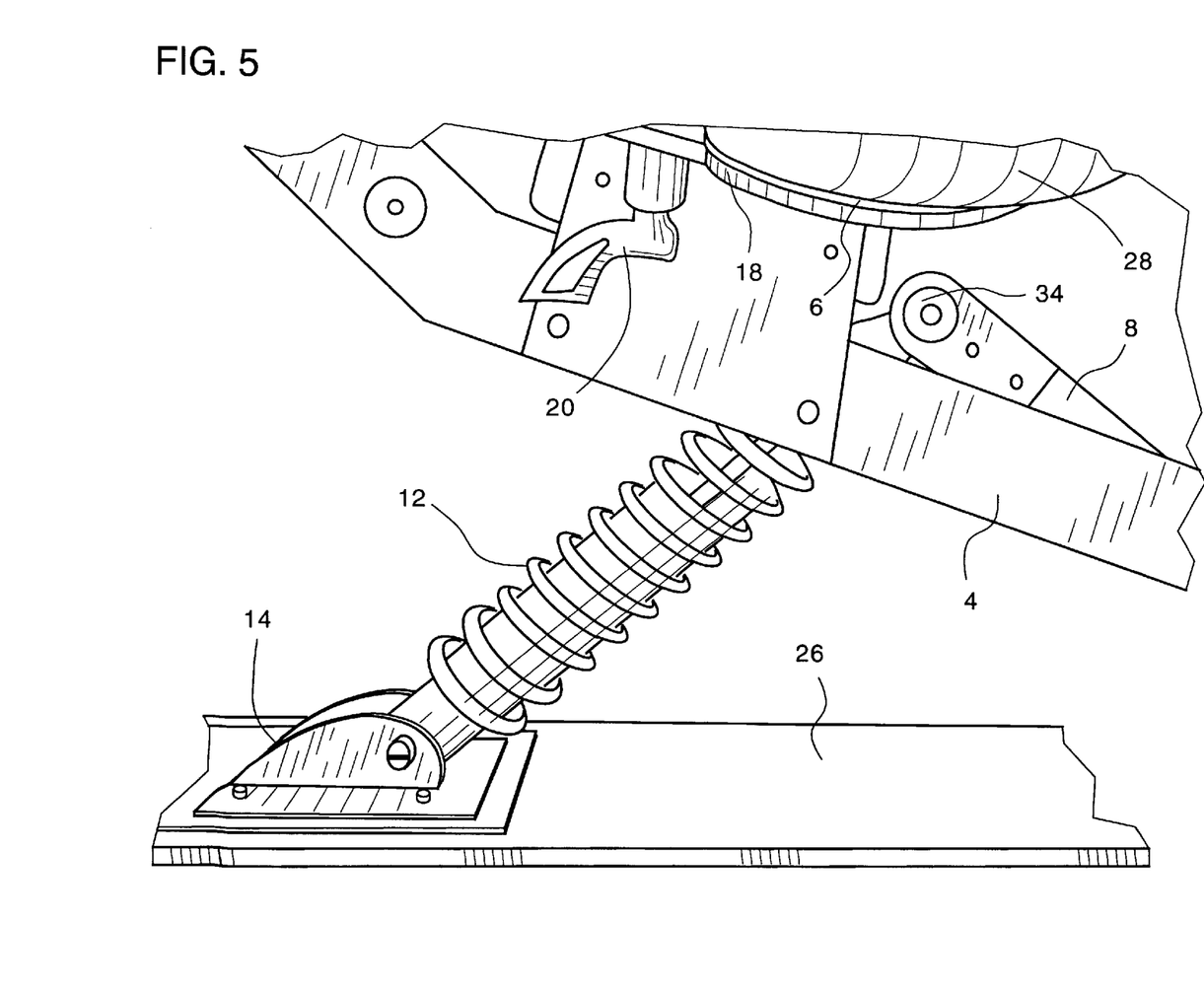
FIG. 5. A view of the adjustable shock absorber
Figure 6:
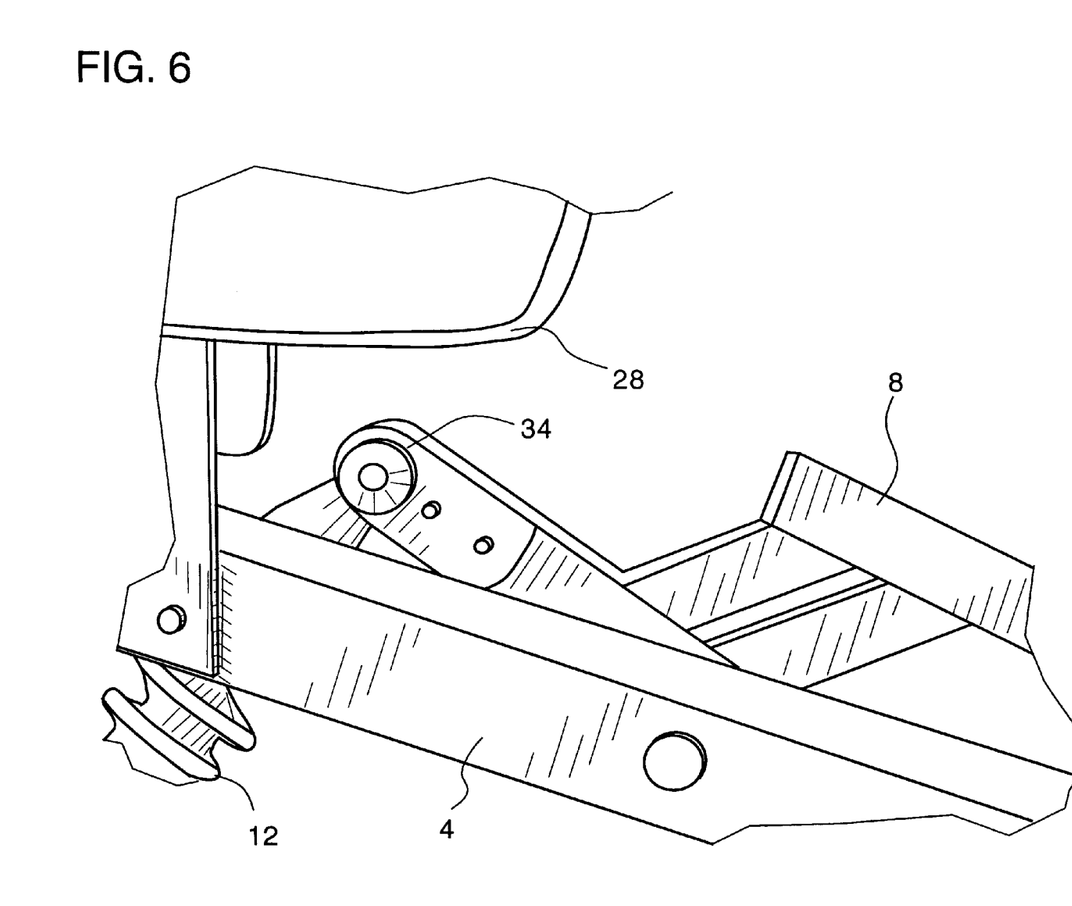
Figure 7:
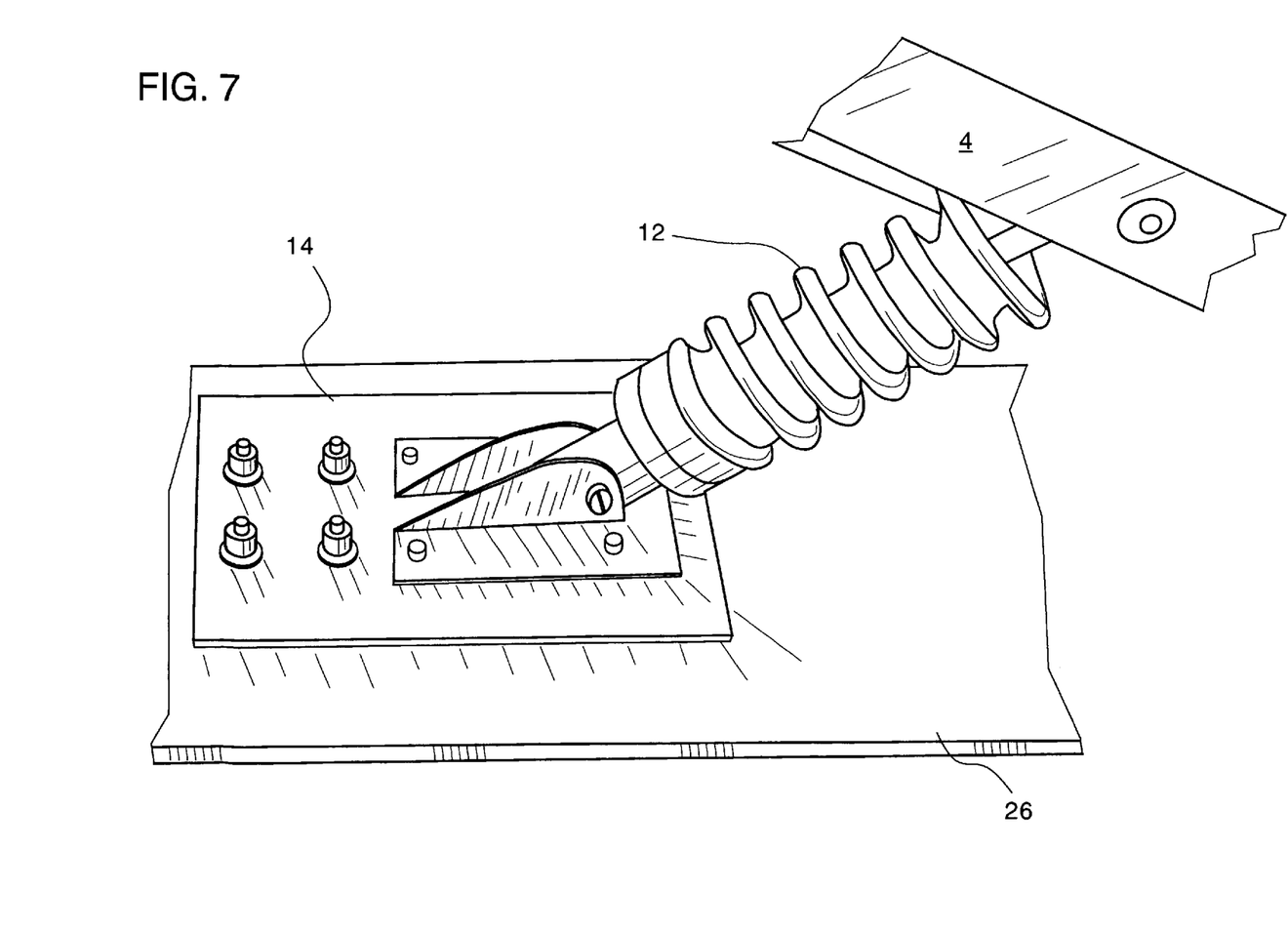

As shown in FIG. 4., when the user lifts the lifting handle lever 8, the primary suspension bar 4 lifts the user in the direction of the first foot 2. Preferably, the hinge connection between the top of the secondary suspension bar 12 and the lower portion of the lifting handle lever 8 is a lock hinge connection 34 such that when the user lifts the lifting handle lever 8, the user is locked in the upward position when the angle between the top of the secondary suspension bar 12 and the lower portion of the lifting handle lever 8 reaches approximately 180°.

Figure 8:
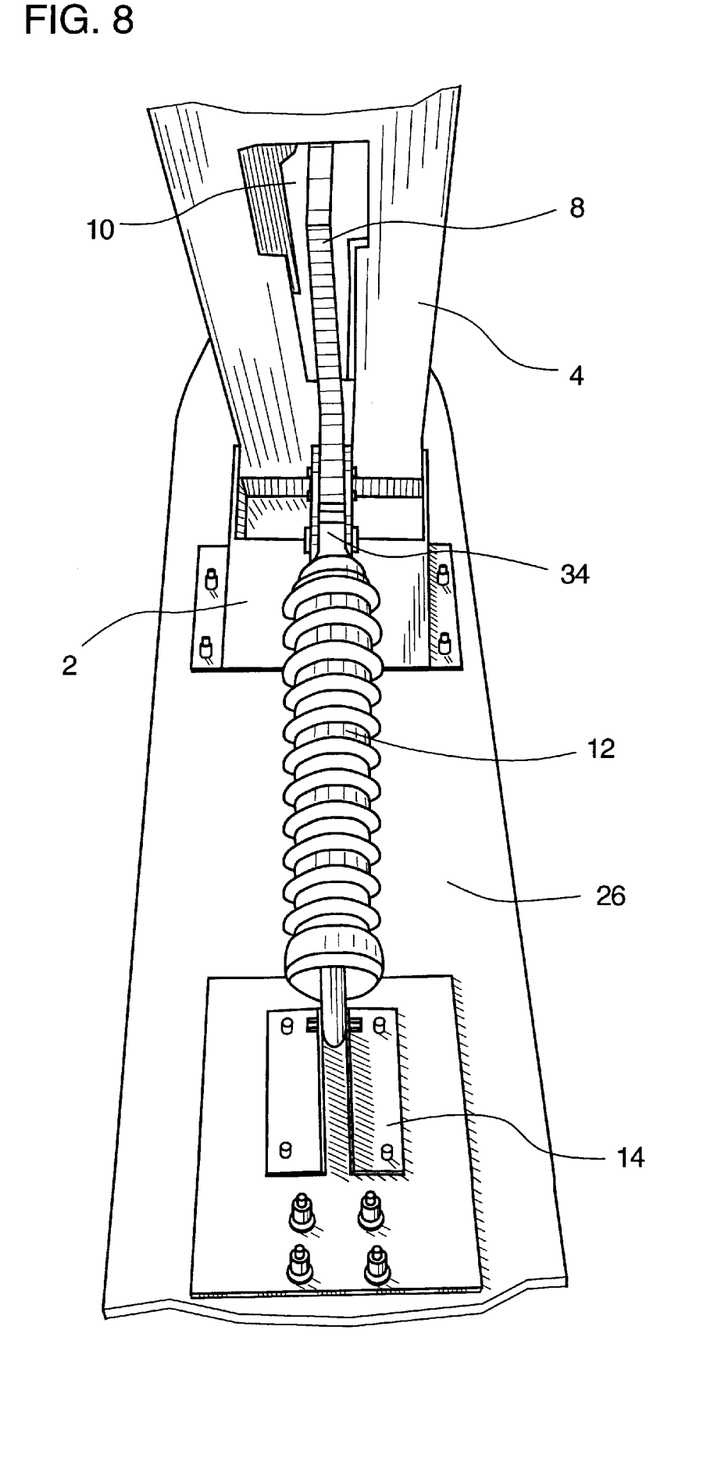
Figure 9:
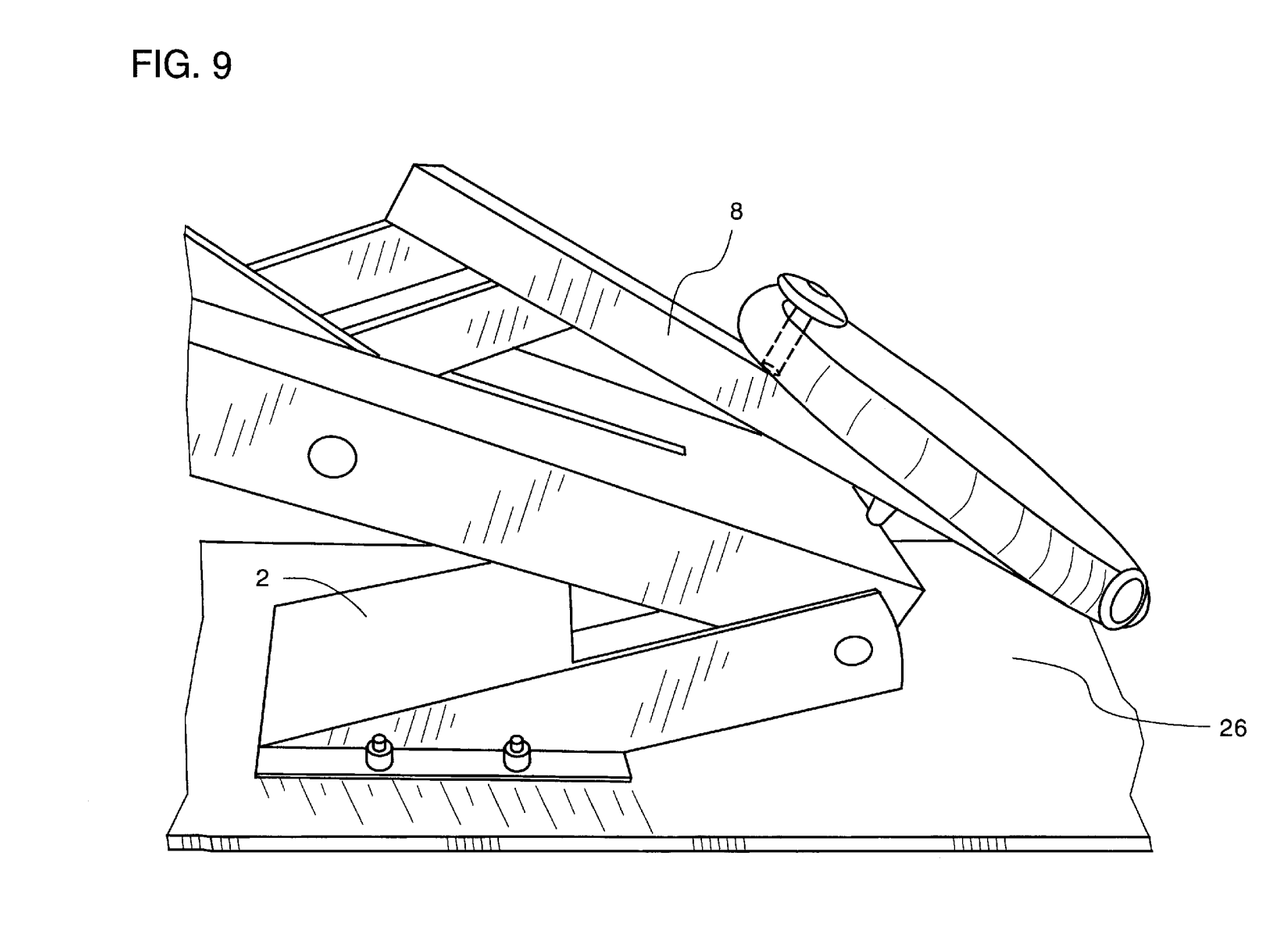

When the accessible seating assembly is used, a user will sit on their knees on the base 28 of the seat 24 with leg straps 32 holding them down in the seat 28 and the back support 30 providing the user with something to lean back against. After strapping into the seat 24, the user will then be able to rotate the seat 24 to a comfortable riding position by releasing the clamp 20 and swiveling the seat 24 on the seat plate 6. After reaching their desired riding position, the user can lock the seat 24 in place by closing the clamp 20. The rider can readjust the position of the seat 24 at any time by re-releasing and re-closing the clamp 20. The user will normally ride with the lifting handle lever 8 in the downward position as depicted in FIG. 1. However, if the user needs to ride a ski lift, the user can rotate the seat 24 such that the user is facing toward the first foot 2 end of the snowboard 26, and lift the lifting handle lever 8 until the seat 24 is locked in the upright position (as depicted in FIG. 8). This will enable the chair lift surface to fit under the seating attachment and allow the user to ride the lift. After the departing the lift, the user can return to the downward position by pushing the lifting handle lever 8 down until it is approximately parallel with the primary suspension bar 4. At this time, the rider can readjust the seat 24 and begin riding.

What is claimed is:

1. An accessible seating assembly for use on moveable sporting articles, the assembly comprising:

a first foot attached to the sporting article;

a primary suspension bar having a top and a bottom and a slot located between the top and bottom, the bottom rotatably attached to the first foot and the top attached to a clamp plate;

a lifting handle rotatably attached within the slot, the lifting handle having a handle end and a lower portion, the lower portion rotatably attached to a top of a secondary suspension bar with a lock hinge connection;

the secondary suspension bar having a bottom, the bottom rotatably attached to a second foot;

the second foot attached to the sporting article;

a seat plate attached to a base of a seating attachment, the seating attachment having a seat, that is rotatable about a vertical axis a base, a leg strap and a back support for retaining a rider and providing steering of the sporting article by the rider, and the seat plate located between a clamp plate and a clamp bar, the clamp bar attached to the clamp plate and a clamp interconnecting the clamp bar and clamp plate for biasing the clamp bar against the seat plate and clamp plate and thereby retaining the seat plate and seating attachment in an adjustably fixed position relative to the sporting article.

2. The accessible seating assembly of claim 1, wherein:

the first foot having a bolt pattern matching the bolt pattern of the sporting article;

the second foot having a bolt pattern matching the bolt pattern of the sporting article.

3. The accessible seating assembly of claim 1, wherein:

the secondary suspension bar is an adjustable shock absorber.

4. An accessible seating assembly for attachment to a uni-track apparatus, the seating assembly comprising:

a first foot attached to the uni-track apparatus;

a primary suspension bar rotatably attached to the first foot, the primary suspension bar having a bottom end and a top end, a rotatable lifting handle lever attached to the primary suspension bar between the bottom end and the top end;

the lifting handle lever having a handle end and a lower portion, the lower portion rotatably attached to a top end of a secondary suspension bar, the secondary suspension bar having a bottom end rotatably attached to a second foot;

the handle end of the lifting handle lever rotatable from a riding position where the lifting handle lever is near the primary suspension bar to one where the lifting handle levers is away from the primary suspension bar or to a lift position such that the lifting handle lever pushes on the secondary suspension bar and a seating attachment rotates around a horizontal axis away from the second foot and the lower portion of the lifting handle lever and the lower portion of the secondary suspension bar align to about one hundred eighty degrees;

the second foot attached to the uni-track apparatus;

the releasably rotatable seating attachment attached near the top end of the primary suspension bar; and the seating attachment having a seat and a seat plate attached to a base of the seat, a clamp plate attached near the top end of the primary suspension bar, a clamp bar engaging the seat plate and attached to the clamp plate, a clamp affixed to the clamp bar and the clamp plate, the clamp for biasing the clamp bar against the seat plate and the seat plate against the clamp plate thereby retaining the seat in a vertical axis rotatable temporarily fixed rotational position relative to the uni-track apparatus.

5. The accessible seating assembly of claim 4, wherein:

the first foot having a bolt pattern matching the bolt pattern of the uni-track apparatus;

the second foot having a bolt pattern matching the bolt pattern of the uni-track apparatus.

6. The accessible seating assembly of claim 4, wherein:

the secondary suspension bar is an adjustable shock absorber.

7. A seating assembly for attachment to a snowboard, the seating assembly comprising:

a seating attachment fixable in a user chosen position around a vertical axis relative to the snowboard;

the seating attachment having a seat with a back support, a base and a leg strap, a seat plate attached to the base of the seat;

the seat plate rotatably attached to a clamp plate which is attached near a top end of a primary suspension bar, a clamp bar attached to the clamp plate and engaging the seat plate, a clamp attached to the clamp plate and the clamp bar, the clamp bar for biasing the seat plate towards the clamp plate and adjustably fixing the rotation of the seating attachment relative to the primary suspension bar;

the primary suspension bar having a bottom end rotatably attached to a first foot, the first foot attached to the snowboard, a slot located between the top end and the bottom end of the primary suspension bar;

a lifting handle lever rotatably attached in the slot, the lifting handle lever top end attached to a secondary suspension bar top end with a lock hinge connection, a handle end located near the primary suspension bar when the seating assembly is a riding position;

the secondary suspension bar rotatably attached at the bottom end to a second foot which is attached to the snowboard; and whereby the release of the clamp allows the seating attachment to rotate around a vertical axis to a user defined position and fixed relative to the snowboard and the lifting of the lifting handle away from the primary suspension bar biases the seating attachment away from the snowboard.

8. The accessible seating assembly of claim 7, wherein:

the first foot having a bolt pattern matching the bolt pattern of the snowboard;

the second foot having a bolt pattern matching the bolt pattern of the snowboard.

9. The accessible seating assembly of claim 7, wherein:

the secondary suspension bar is an adjustable shock absorber.

* * * * *